(12) United States Patent
Venable et al.

(10) Patent No.: US 6,326,983 B1
(45) Date of Patent: *Dec. 4, 2001

(54) STRUCTURED IMAGE (SI) FORMAT FOR DESCRIBING COMPLEX COLOR RASTER IMAGES

(75) Inventors: Dennis L. Venable, Rochester; Michael R. Campanelli, Webster; William A. Fuss, Rochester; James E. Bollman, Williamson, all of NY (US); Takashi Nagao, Kanagawa (JP); Toshiya Yamada, Kanagawa (JP); Kazuya Yamada, Kanagawa (JP)

(73) Assignees: Xerox Corporation, Stamford, CT (US); Fuji Xerox Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/553,232

(22) Filed: Nov. 7, 1995

Related U.S. Application Data

(63) Continuation of application No. 08/133,422, filed on Oct. 8, 1993, now Pat. No. 5,485,568.

(51) Int. Cl.$^7$ .............................. G06F 3/14; G06T 11/60
(52) U.S. Cl. ......................... 345/763; 345/589; 707/500
(58) Field of Search .................................. 395/155, 159, 395/160, 161, 117, 128, 147, 148, 109, 133; 345/700, 763–765, 769–770, 835, 853, 581, 589, 592, 619; 707/500; 358/1.9, 1.18

(56) References Cited

U.S. PATENT DOCUMENTS

| 4,667,248 | 5/1987 | Kanno ................................ 358/452 |
| 4,742,558 | 5/1988 | Ishibashi et al. .................... 382/240 |
| 4,813,013 | 3/1989 | Dunn et al. ......................... 345/763 |
| 5,021,976 | 6/1991 | Wexelblat et al. .................. 345/853 |
| 5,181,162 | * 1/1993 | Smith et al. ........................ 707/530 |
| 5,278,950 | * 1/1994 | Takei et al. ......................... 345/613 |
| 5,353,388 | 10/1994 | Motoyama ........................ 358/1.18 |
| 5,416,900 | 5/1995 | Blanchard et al. ................. 345/804 |
| 5,485,568 | * 1/1996 | Venable et al. ..................... 707/500 |
| 5,490,246 | * 2/1996 | Brotsky et al. ..................... 345/763 |
| 5,790,708 | 8/1998 | Delean ............................... 382/270 |
| 5,907,640 | 5/1999 | Delean ............................... 382/276 |
| 6,181,836 | 1/2001 | Delean ............................... 382/302 |

FOREIGN PATENT DOCUMENTS

| 0 528 631 A2 | 2/1993 | (EP) . |
| 0 576 178 A2 | 12/1993 | (EP) . |
| 0-475-734 | 3/1992 | (WO) . |
| 0-528-631 | 2/1993 | (WO) . |
| 0-576-178 | 12/1993 | (WO) . |

OTHER PUBLICATIONS

Toby Howard, "A Shareable Centralised Database for KRT$^3$: A Hierarchical Graphics System Based on PHIGS", *Comput. & Graphics*, vol. 12, No. 2, pp. 201–211, 1998.

Hiroshi Toriya. et al., "Undo and Redo Operations for Solid Modeling", *I.E.E.E. Computer Graphics and Applications*, vol. 6, No. 4, Apr. 1986.

Jürgen Schönhut et al., "Constructive Page Description", *I.E.E.E. Computer Graphics and Applications*, vol. 11, No. 2, Mar. 1991.

Pehong Chen et al., "Multiple Representation Document Development", *Computer*, vol. 21, No. 1, Jan. 1988.

(List continued on next page.)

Primary Examiner—Crescello N. dela Torre
(74) Attorney, Agent, or Firm—Oliff & Berridge, PLC; Eugene O. Palazzo

(57) ABSTRACT

A method and device for describing a complex color raster image as a collection of objects in a hierarchical and device independent format can be carried out using an apparatus for generating an image capable of being displayed and printed.

24 Claims, 17 Drawing Sheets

OTHER PUBLICATIONS

Pehong Chen et al., "Multiple Representation Document Development", Computer, vol. 21, No. 1 (Jan. 1988), pp. 15–31.

Jürgen Schönhut et al., "Constructive Page Description", IEEE Computer Graphics & Applications, vol. 11, No. 2 (Mar. 1991), pp. 71–78.

IEEE Computer Graphics & Applications Journal, Mar. 1991, pp. 71–78, "Constructive Page Description," by J. Schonhut, H. Wiedling and V. Samara.

Smith, "Building Interfaces Interactively", Proceedings of the ACM Siggraph, Symposium on User Software, Oct. 17, 1988, pp. 144–151.

Wyvill, "Space Division for Ray Tracing in CSG", IEEE Computer Graphics and Applications, vol. 6, No. 4, pp. 28–34, Apr., 1986.

Bier et al., "Gabriel: A Design Environment for DSP", IEEE Micro. vol. 10, No. 5, pp. 28–45, Oct., 1990.

Chang, "Visual Languages", IEEE Software, pp. 29–39, Jan., 1987.

Hirakawa et al., "An Ionic Programming System, HI–Visual", IEEE Transactions on Software Engineering, vol. 16, No. 10, pp. 1178–1184, Oct., 1990.

Microsoft Paintbrush, Microsoft Corp., pp. 11–20, 1986.

Zilles, et al., "The Escher Document Imaging Model", ACM Conference on Document Processing Systems, pp. 159–168, Dec., 1988.

Yoshimoto et al., "Interactive Iconic Programming Facility in HI–Visual", IEEE Computer Society Workshop on Visual Languages, pp. 34–41, Jun. 25–27, 1986.

Ichikawa et al., "Visual Programming Toward Realization of User–Friendly Programming Environments", ACM and IEEE Computer Society Fall Joint Computer Conference, pp. 129–137, 1987.

Hirakawa et al., "A Generic Model for Constructing Visual Programming Systems", IEEE Workshop on Visual Languages, pp. 124–129, 1989.

* cited by examiner

```
#!SIDL-1.1
#0000
#Copyright:(c) 1993 Fuji
Xerox Co. Ltd. and Xerox
Corp.
#Creator: Dennis L. Venable
#Created: 27-05-93 21:00:00
EDT
#Revision:1.0.0
#Root:SI-Example
EndHeader Object: SI-Example = {
    IPD = $ipd1 ;
    } ;

IPD: ipd1 = {
    AspectRatio = 0.7727 ;
    DefaultWidth = 11in ;
    FitMode = FitInside ;
    Justifcation = Center ;
    Angle = 0.0 ;
    Merge = $merge1;
    Merge = $merge2;
    Merge = $merge3;
    Merge = $merge4;
    };

Merge: merge1 = {
    MergePoint = 0.0 0.0;
    Path = $path1;
    };

Merge: merge2 = {
    MergePoint = 0.4 0.2;
    Path = $path2;
    };

Merge: merge3 = {
    MergePoint = 0.3 0.3;
    Path = $path3;
    };

Merge: merge4 = {
    MergePoint = 0.1 0.1;
    Path = $path4;
```

FIG. 19a

```
Path: path1 = {
    Object = $mount1;
    Size = 1.0 1.0;
    ControlPoint = 0.0 0.0;
    IPO: 1 = {
       IPOName = Enhance;
       };
    };

Object: mount1 = {
    External = {
       System = "unix";
       Name = "mount.tif";
       };
    };

Path: path2 = {
    Object = $text1;
    Size = 0.6 0.3;
    ControlPoint = 0.0 0.0;
    };

Object: text1 = {
    External = {
       System = "unix";
       Name = "sample.toytext";
       .
       };
    };

Path: = path3 = {
    Object = $home;
    Size = 0.7 0.6;
    ControlPoint = 0.0 0.0;
    };

Object: home = {
    External = {
       System = "unix";
       Name =
       "house_tree.sid";
```

FIG.19b

```
Path: path4 = {
    Object = $bird1;
    Size = 0.2 0.3;
    ControlPoint = 0.0 0.0
    .
    .
    IPO: 1 = {
        IPOName = Crop;
        Window = 0.2 0.0
        0.8 0.7;
    };
    IPO: 2 = {
        IPOName =
        ColorAdjust;
        Hue = 0.9;
        Chroma = 0.5;
    };
    IPO: 3 = {
        IPOName =
            SpatialTransform
        .
        Operation = Scale;
        Param = 1.2;
    };
};

Object: bird1 = {
    External = {
        System = "unix";
        Name = "bird.ras";
    };
};
```

FIG. 19c

```
!MR-1.0 representation = {
    format = "sunras";
    attribute = {
        dpi = 200;
    };
    data         = "/image/bird.small.ras";
};

representation = {
    format = "sunras";
    attribute = {
        dpi = 400;
    };
    data = "/image/bird.larger.ras";
};
representation = {
    format = "TiFF";
    attribute = {
```

FIG. 20a

STRUCTURED IMAGE (SI) FORMAT FOR DESCRIBING COMPLEX COLOR RASTER IMAGES

This is continuation of application Ser. No. 08/133,422 filed Oct. 8, 1993, now U.S. Pat. No. 5,485,568.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

1. Field of the Invention

This invention relates to an image processor/generator for representing a complex color raster image as a collection of objects in a hierarchical and device independent format and, more particularly, to an SI format that includes not only source data, but also the image processing operations required for rendering them and supports re-editability, customization and enhancement, automatic image assembly, and high performance imaging using an appropriate user interface.

2. Description of Related Developments

Commercially available packages in use today require considerable memory to operate. For example, Adobe Photoshop® stores three copies of the full size raster during interactive editing. Thus, a typical 24-bit color image (8½× 11 at 300 dpi) can require 24 megabytes of memory for each image copy.

Further, commercial software often exhibits sluggish to poor performance when editing large imagery. Again, Photoshop® must store, as discussed above, three copies of the image (no matter how large it is). Since every interactive operation processes the full image, performance is extremely slow.

Additionally, typical commercial software stores output imagery as complete rasters. Therefore, for each new version of an image, a complete raster must be written out and you cannot undo the operations contained in those versions. At 24 megabytes per image, as discussed above, disk requirements can be extensive. Also, archiving such imagery can require extensive storage space as well.

Further, a critical need exists for an image processor in the commercial printing arena with the ability to create a job template for constructing multiple, customized images. Few, if any, commercial image processing packages exist that will allow the creation of such job application templates. Additionally, commercial image processing software packages, such as Photoshop®, have limited ability to render the output image optimized for the output device. Typically, color correction and simple resolution conversion is all that may be applied.

Additionally, in typical commercial image processing software, the ability to edit the list of image processing operations performed by the operator is also very limited. For example, Photoshop® allows only one undo operation. Also, typical commercial software does not allow for the optimization of image processing. That is, once an image is created, the ability to combine operations and increase performance on high resolution imagery is lost.

Finally, there exists a strong industry interest in structured document theory and how this technology can affect products and services. Current structured document theory considers a raster image as a simple content block with no hierarchical nature or image processing operations associated with it. For a page oriented description, see IEEE Computer Graphics & Applications Journal, March 1991, pages 71–78, "Constructive Page Description," by J. Schonhut, H. Wiedling and V. Samara. For a general description of structured documents, see "Structured Documents", by J. Andre, R. Furuta and V. Quint, Cambridge Series on Electronic Publishing, 1989.

SUMMARY OF THE INVENTION

It is thus an object of the invention to obviate the foregoing drawbacks by providing an Si format that can operate on display resolution imagery with minimal memory requirements yet capable of producing high resolution, high quality printed images. Si is a base technology capable of addressing the entire gamut of acquisition of objects, storage, edit/preparation and delivery/transmit to output rendering.

It is another object of the invention to provide an Si format capable of operating interactively on display resolution imagery and, therefore, having good interactive performance. Further, high resolution output can be generated by merely requesting an Si to be rendered, or rasterized, at high resolution. The rendering process will automatically use appropriate source imagery and device dependent information to render for specific devices. Although other image editors can use display resolution images, SI will pick the resolution of the image according to the task.

It is still another object of Si to store imagery as a text file containing pointers to component objects. Output rasters are not generated until required for display or printing. Therefore, hundreds of versions of an SI can exist in the amount of disk space required typically by one raster image. Since an SI does not store the rasters of the component objects within the SI file, the use of archival imagery such as clip art, for example, becomes much more efficient as only one copy of the source is required.

It is also an object of the invention to provide Sls that can be created to contain undefined references to both component objects and image processing parameters. Such an SI can be rendered by providing the undefined information as, for example, command line arguments. The SI can be rendered many times with different input data to generate custom output rasters. The ability to have valid Sls containing undefined references enables customization and automatic image assembly.

It is another object of the invention to have Sls store all component data in "native" form (i.e., text is stored as ASCII, graphics stored in CGM format or some other appropriate format, etc.). Appropriate render procedures will convert the native form to rasters using device dependent characteristics to optimize the rendering. Proper scaling of component data is inherent to SI rendering.

Finally, it is still another object of the invention to provide Sls that contain pointers to original component data and a description of all image processing operations applied to the image. Editing prior operations can be as simple as editing a text file. Interactive editors based on SI can allow editing of the operations interactively through either text editing, or through a structured image editor. Image processing operations can be added, deleted and modified with appropriate user commands.

In order to achieve the foregoing and other objects, and to overcome the shortcomings discussed above, an SI is defined which, in its simplest form, is described by a set of representations and a pasteboard. Representations specify the content of the SI; the pasteboard specifies the "frame" of the SI. The concept of multiple raster representations is understood in the art and is currently in use in several available applications. With SI, however, the idea of multiple representations is expanded to include non-raster data such as text, graphics and image composites which specify the image processing and merging of multiple component objects. Component objects such as text and graphics are stored in their native format for editability. The requirement of a valid representation is that it be renderable into raster form, and that all representations of a single SI have the same "look" when rendered, i.e., all representations must have an essentially similar appearance. They may have different dimensions or encodings but must clearly be renderings of the same image.

Other objects, advantages, and salient features of the invention will become apparent from the detailed description which, taken in conjunction with the annexed drawings, disclose the preferred embodiments of the invention.

BRIEF DESCRIPTION OF THE DRAWINGS

Referring now to the drawings which form part of this original disclosure:

FIGS. 19a–c provide the SID files associated with the top level SI shown in FIG. 18;

FIGS. 20a–b depict an exemplary Multiple Representation (MR) file and a graphic demonstration thereof;

DETAILED DESCRIPTION OF PREFERRED EMBODIMENTS

A. System Overview

Structured Imaging (SI) is a hierarchical description of a composite raster image composed of component images (i.e., child objects) and the image processing operations (IPOs) necessary to render the output raster image. Any data type that can be rendered as a raster is a potential component of an SI. SI is an enabler for the creation and manipulation of complex images easily and quickly for inclusion into printed documents.

Figure 1:
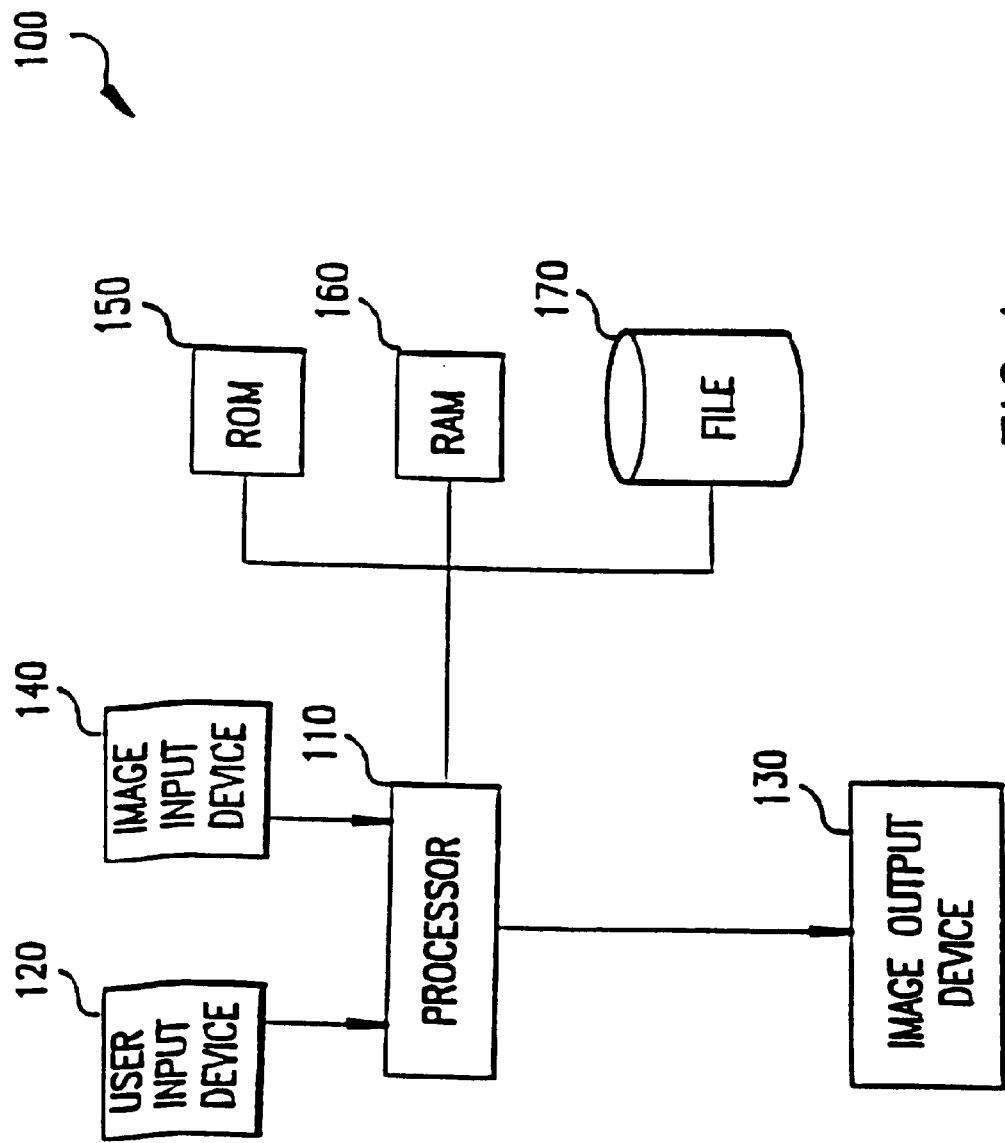
FIG. 1 is a block diagram showing general components that can be used with the invention.

SI can be implemented (see FIG. 1) on a conventional hardware system 100 which includes a microprocessor 110 for receiving signals from, and outputting signals to, various other components of system 100 according to one or more software programs run on a microprocessor 110. A user input device 120 such as, a mouse, a keyboard, a touchscreen and/or combinations thereof is provided for permitting an operator to interface with SI by, for example, supplying control signals thereto. An image output device 130, such as, a video display monitor, or a printer can be provided for outputting SI data. An SI input device 140, such as, a scanner can be provided for scanning images which are then stored in memory as image sources. Image sources can also be supplied from, for example, disks.

The microprocessor 110 includes a read-only memory (ROM) 150 for storing operating programs and image data, used by SI to construct and edit images. A random access memory (RAM) 160 is provided for running the various operating programs and additional files 170 can be provided for RAM overflow.

Importantly, however, SI can also be implemented into embedded systems (not shown), as well as networked systems where the various hardware components are networked and may or may not reside in the same location (also not shown). There is no requirement that the hardware system be hard-wired. The above described conventional hardware system is provided for example only and is no more preferred than the embedded or networked systems.

A1. Structured Imaging Defined

An SI is defined by an "object" which is a representation of data that can be rendered into a raster image, and a "pasteboard" that represents a "frame" for the object to be rendered onto. An SI does not have absolute size specified within the SI description. The size of each sub-object is stored within the pasteboard as a size relative to the sub-object's parent.

To convert an SI object into a raster image, the ReadObject( ) rendering procedure, see below, is invoked through appropriate command instructions using, for example, the user input device 120, with the object, pasteboard, and absolute dimensions of the parent object as parameters. The SI object and any child objects will be rendered to the proper output size automatically. An SI is described by a Structured Image Definition (SID) file.

It should also be understood that an SI object may be automatically scanned into the SID using appropriate SI scanning software. Thus, interactive editing is by no means the only method of creating or preparing a SID for printing.

A2. Structured Image Object

Figure 2:
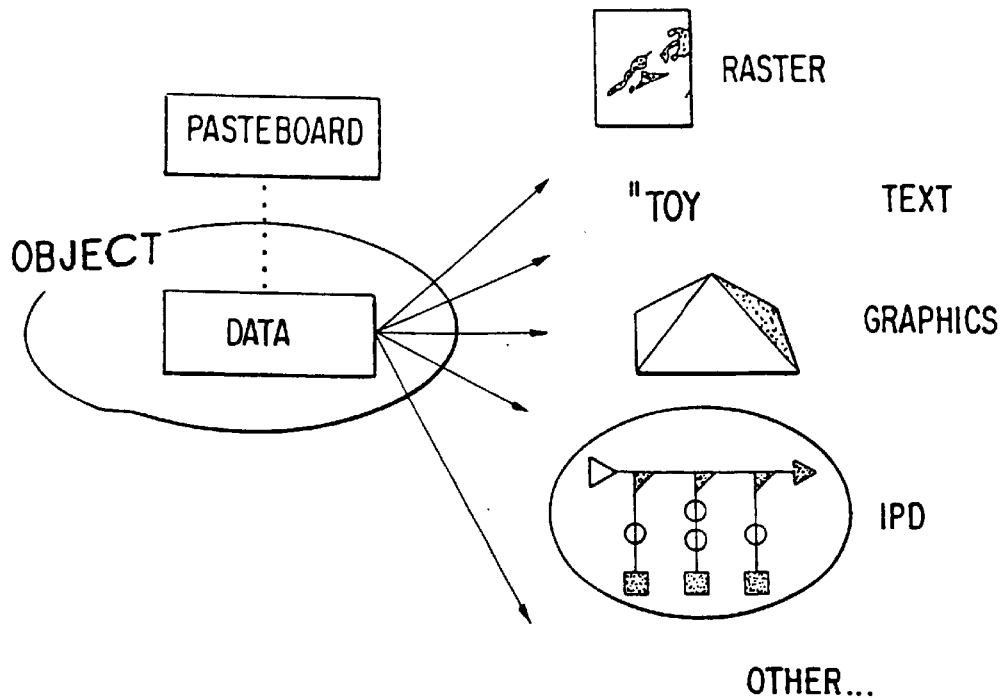
FIG. 2 is a graphic representation showing the variety of data types that make up an SI object.

An SI object is a representation of data (see FIG. 2) that can be rendered into a raster image. This data may represent simple raster images, such as, TiFF files, or more complicated data such as a hierarchical collection of sub-objects and associated raster processing operations. Possible object data types include:

1) raster image—TiFF, RES, or other digital display,
2) toy text—simple text annotation,
3) CGM graphics—simple graphical annotation,
4) IPD—SI image processing description,
5) MR file—file containing a description of multiple image representations.

An important feature of SI technology is the ability to store image processing operations (IPOs) within the SID. The object data type IPD provides the mechanism for storing IPOs, as will be discussed in greater detail below.

Figure 3:
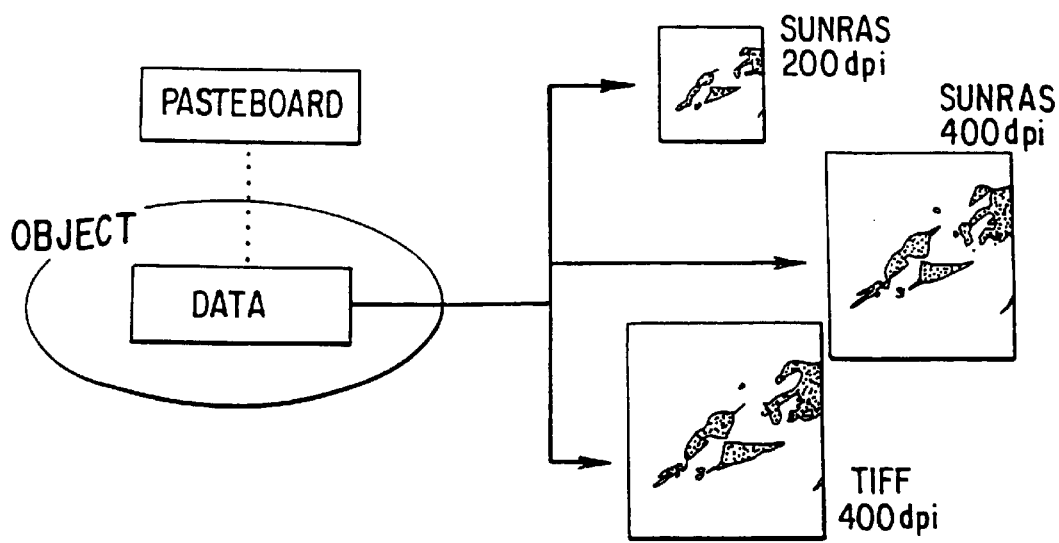
FIG. 3 is a graphic representation showing an example of the Multiple Representations (MR) that make up an SI object.

A single SI object may represent more than one data type and/or data file. For example (see FIG. 3), a single SI object may reference a directory containing several TIFF files stored at different resolutions. Each TiFF file represents the same image, but has different absolute pixel dimensions and photometry. This concept is known as multiple representations (MR). SI specifies multiple representations to be determined dynamically, but the MR file format is defined for those applications that require explicit specifications of multiple representations (as will be described below).

The topmost object in an SI, i.e., the object which has no parent, is called the root object. This will be described in greater detail in the discussion of the object rendering process below.

A3. Pasteboard

The pasteboard is the "frame" into which SI objects are rendered. Several attributes can be specified within the pasteboard (see FIG. 3): 1) RelativeSize; 2) Angle; 3) FitMode; 4) Justification; and 5) ControlPoint.

The pasteboard specifies the size of the rendered object relative to its parent object. For example, the pasteboard applied to a sub-object may specify a size such as (1.0,0.5) relative to the parent object, where (1.0,0.5)=width and height ratios. At render time, if the parent is specified to render at (1000×2000) pixels, the sub-object would be rendered at (1000×1000) pixels since the pasteboard dimension specified that the subobject to render at the full width but half the height. The default relative size is (1.0,1.0).

Figure 4:
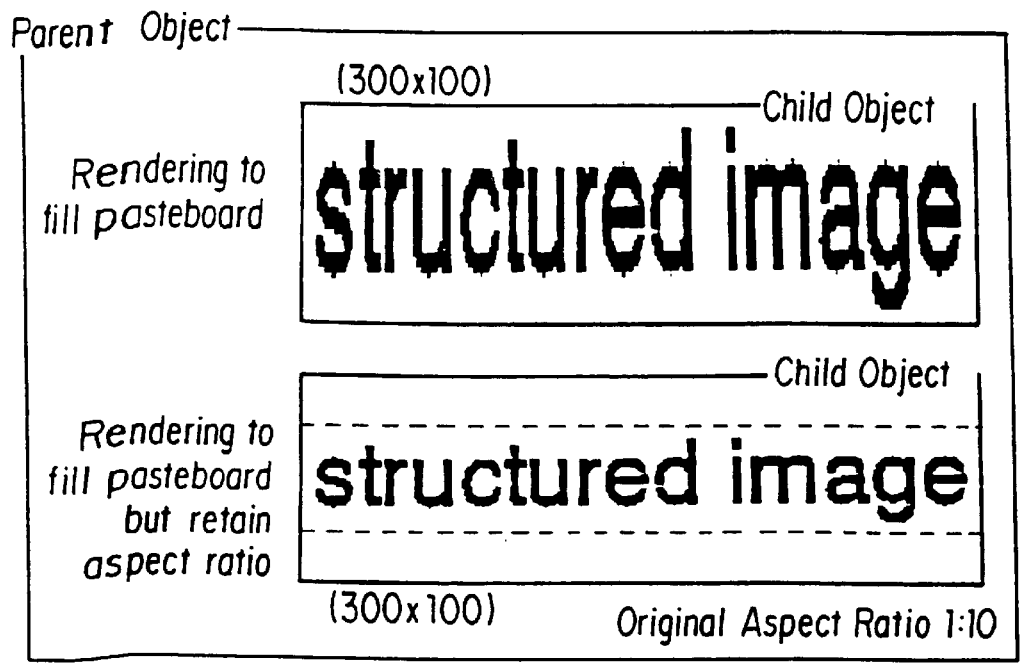
FIG. 4 is a graphic representation showing rendering to maintain the Aspect Ratio.

When rendering an SI, relative size of the pasteboard is used to determine the absolute size of the pasteboard based on the absolute size of the parent object (see FIG. 4). However, for reasons of optimal quality rendering, it may be preferable to have the child object render to different absolute dimensions than the dimensions determined by the pasteboard and parent size. For example, consider the child object to be a TiFF file of scanned text with an aspect ratio of 10 to 1 (width to height). Consider the associated pasteboard to have a relative size of (0.67,0.33). Let the parent object be rendered to an absolute size of (450×300) pixels. Therefore, the child pasteboard has an absolute size of (300×100). If the TiFF file were scaled to fit this window, it would be stretched by a factor of 3 in the y-direction, which would greatly distort the text. In this case, it might be preferable to render the text in the original aspect ratio to fit the desired pasteboard, the TIFF file might be scaled to dimensions (300×30) to maintain the 10 to 1 aspect ratio (width to height).

Figure 5:
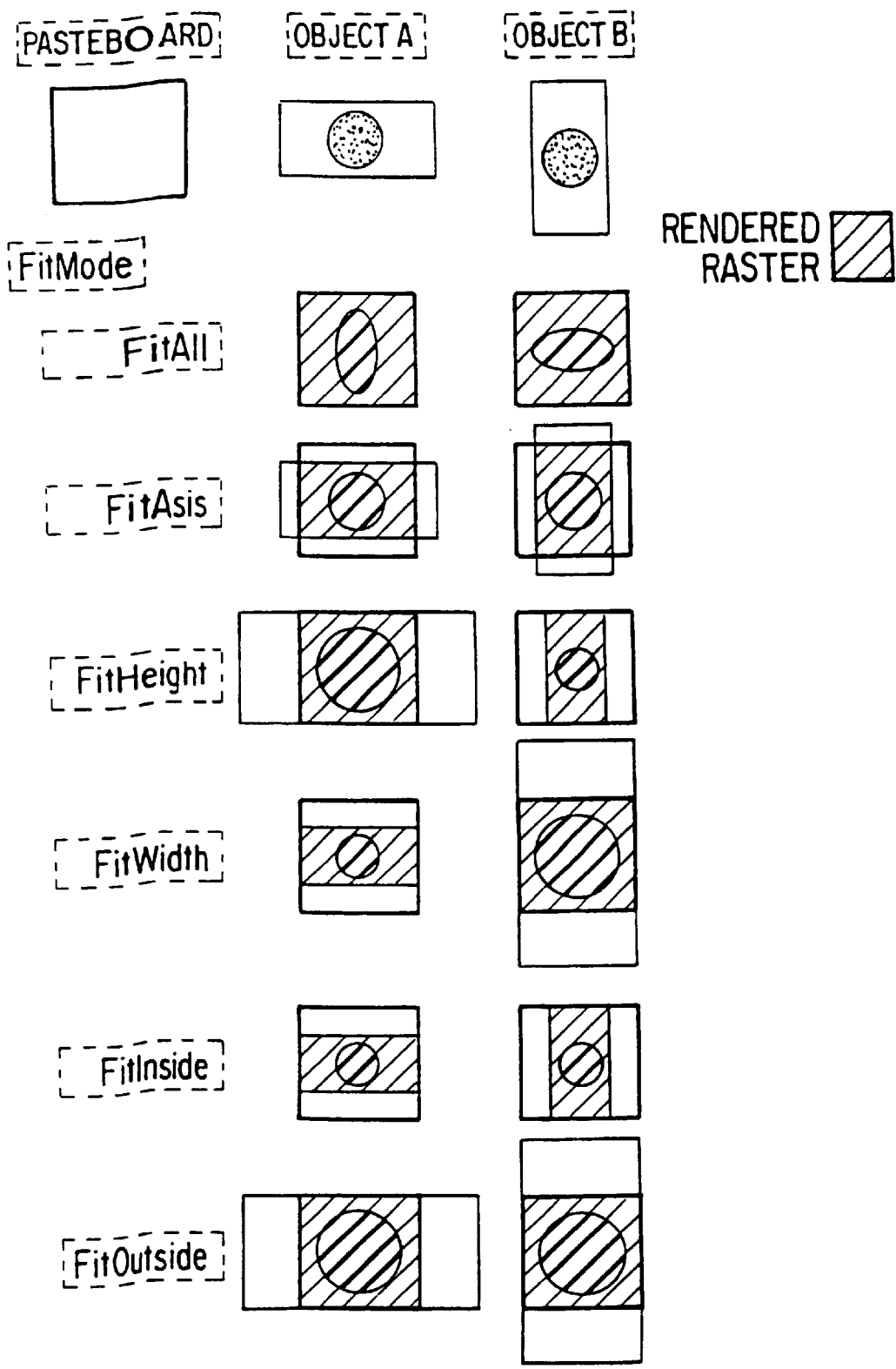
FIG. 5 graphically demonstrates the available FitMode models which define how rasters are rendered in the dimensions defined by the pasteboard in accordance with the invention.

To support this type of rendering, SI defines six FitMode attributes (see FIG. 5) to define how rasters are rendered in the dimensions defined by the pasteboard. These FitModes are defined in FIG. 5. All modes, except FitAll, retain the aspect ratio of the object. However, the raster image actually rendered is always limited by the pasteboard size. Therefore, the actual size of the rendered raster is defined by the intersection of the pasteboard size and the size of the rendered object according to the specified FitMode. In FIG. 5, the rendered object for the FitOutside mode is significantly larger than the pasteboard, but the actual rendered raster is limited by the pasteboard. For the Fitinside mode, the object is rendered to fit the pasteboard while maintaining the aspect ratio. Therefore, the actual rendered raster may be smaller than the pasteboard dimensions if the aspect ratio of the object does not match that of the pasteboard. The default FitMode is Fitinside.

Figure 6:
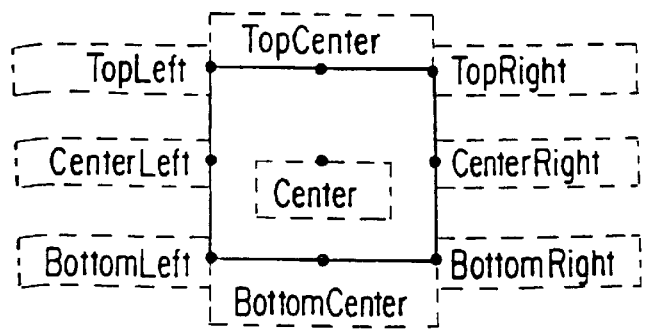
FIGS. 6 and 7 graphically demonstrate the Justification attribute of the invention, with FIG. 6 showing how the Justification attribute is used to specify the rendered raster to be positioned within the pasteboard at one of nine possible locations, and FIG. 7 showing 3 examples of the Justification attribute.
Figure 7:
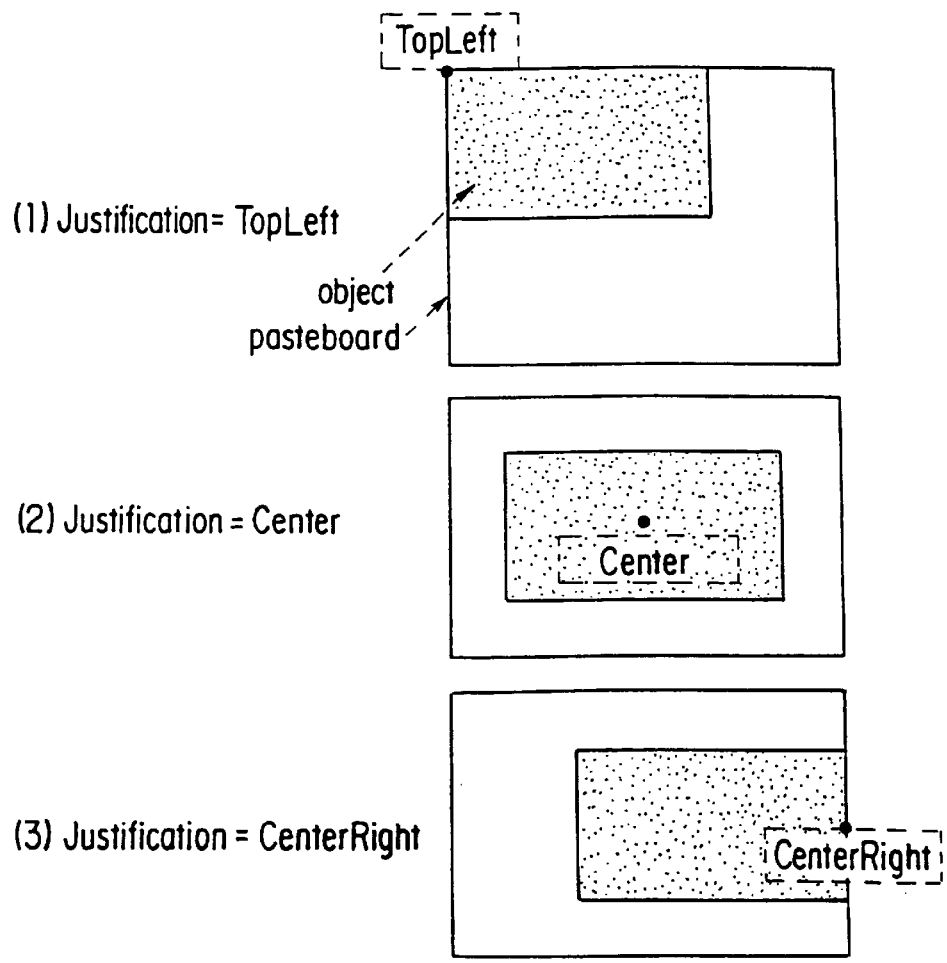

SI objects can be rendered using the FitModes defined above, however, for some applications, it may be desirable to provide control over the location of the rendered raster relative to the size of the pasteboard. The Justification attribute is used to specify where the rendered raster is to be positioned within the pasteboard at one of nine possible locations, as shown in FIG. 6, with examples shown in FIG. 7. The default Justification is Center. The Justification attribute is ignored if the FitMode is FitAll.

Figure 8:
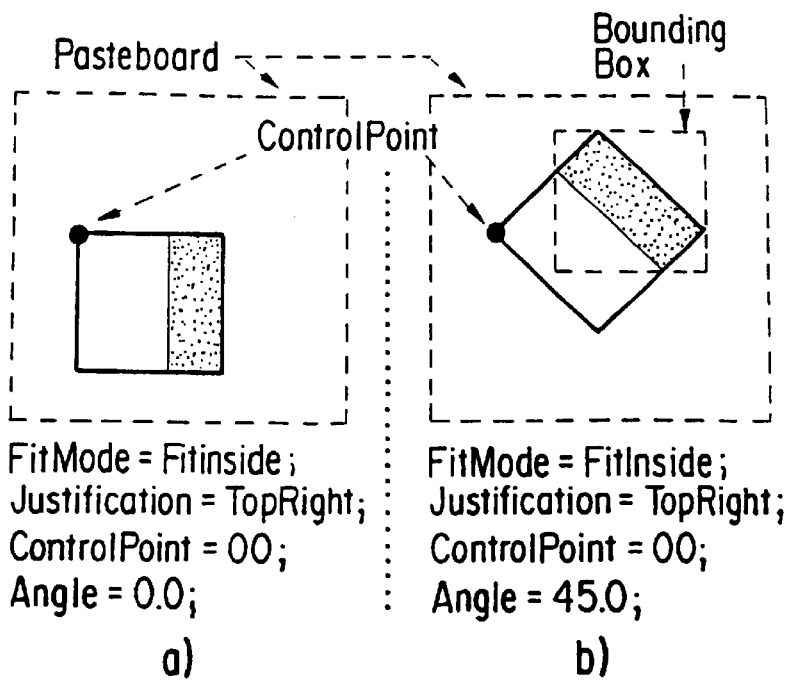
FIG. 8 graphically demonstrates the Angle attribute of the invention, where the (a) side of FIG. 8 shows the unrotated pasteboard and the (b) side shows the rotated pasteboard (note: the object is rotated around the ControlPoint)

Each object may have an Angle attribute used to rotate the rendered object. The effect will be to render the object into the specified pasteboard, then rotate the pasteboard around the ControlPoint (see below) by the specified Angle in degrees (see FIG. 8). It is the responsibility of the object rendering program being used to properly handle rendering the object at the specified Angle. Some rendering programs may be able to optimally render objects at the appropriate Angle; other renderers may invoke a raster rotation program after initial object rendering. This choice is implementation dependent. The actual size of the rendered raster will be a bounding box of the rotated, rendered object as shown in FIG. 8*b*. The default rotation angle is 0.0 degrees.

In the case of a parent object composed of a set of child objects, each child is rendered and merged onto the parent's pasteboard at a location known as the MergePoint. The MergePoint is specified relative to the parent object's pasteboard. The ControlPoint is the corresponding point relative to the child's pasteboard. The ControlPoint of the child is to align with the Merge Point of the parent. For example, a ControlPoint of (0.5, 0.5) results in the child being centered on the Merge Point. The default ControlPoint value is (0.5, 0.5).

The ControlPoint (together with the MergePoint) controls where a rendered child object is merged onto a parent object's pasteboard. Within the SID, the ControlPoint is specified and the pasteboard associated with the child object in coordinates relative to the child's pasteboard. However, a rendered child object will not necessarily fill the specified pasteboard depending on the FitMode and the Angle attributes. Thus, the rendering programs for each object must automatically adjust the ControlPoint to maintain the same relative position with respect to the rendered child.

Figure 9:
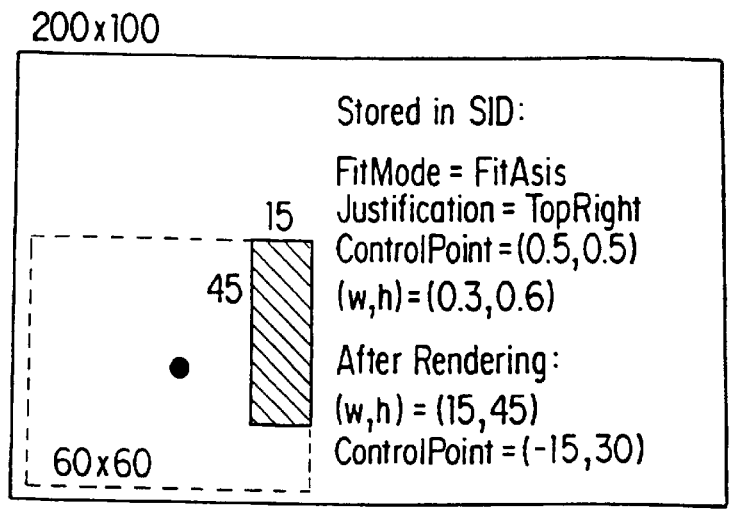
FIG. 9 is a graphic representation showing a rendering adjustment of ControlPoint in accordance with the invention.

Consider the example shown in FIG. 9. The ControlPoint is initially at the center of the child (0.5, 0.5). After rendering with the FitAsis mode with the child justified to TopRight, then ControlPoint will be automatically adjusted to absolute value (−15,30). This will cause the merge operation to position the rendered raster at the expected position. To understand this example, the child is specified in the SID to have size (0.3,0.6). The rendering indicates the parent is (200×100), thus, the requested child size is 60×60. However, the FitMode indicates FitAsis. The actual child is stored at 15×45, so the rendered raster will be 15×45. The Justification indicates TopRight, so the 15×45 raster is positioned at the TopRight of the 60×60 requested size, such that the origin of the rendered raster is at (45,0) relative to the requested raster. Since the raster size that flows up the path is the size of the rendered child and not the 60×60 size of the requested child, the ControlPoint must be adjusted to reflect the shift relative to the actual rendered child. The ControlPoint is mapped to (30,30) relative to the requested child size. Since the rendered child's origin is at (45,0) relative to the origin of the requested size, it is easily seen that the ControlPoint is at (30−45, 30−0)=(−15, 30) relative to the rendered child (see FIG. 9).

ControlPoint information is stored into the header of the rendered raster image. In this manner, ControlPoint information is available to any IPOs that require knowledge of it. In particular, the SpatialTransform IPO must properly adjust the ControlPoint according to the specified transformation, as will be shown in the examples below.

A4. ReadObject

ReadObject( ) represents a procedure that converts an SI object into a raster image suitable for further processing. ReadObject( ) takes a pasteboard, an SI object (whether created or scanned in), and the absolute size of the parent object as parameters. In the case of the RootObject, the specified size is the desired output image dimensions and the relative size field of the pasteboard will typically be empty, implying the default value of (1.0, 1.0). Other information may be passed to ReadObject( ) if such information can be used to improve the quality of the object rendering.

ReadObject( ) performs several operations in order to render the appropriate raster image: 1) determines absolute pasteboard size; 2) determines all representations referenced by the object; 3) based on available information, chooses an appropriate representation for rendering; 4) renders data into raster according to FitMode, Justification and (possibly) Angle by invoking an appropriate rendering procedure; 5) rotates rendered raster to the angle specified by Angle attribute (if not performed in step 4); and 6) adjusts ControlPoint position. The output of the ReadObject( ) procedure is a raster image of the rendered object. The ControlPoint will be specified in the header of the raster image in the coordinate system of the raster image.

ReadObject( ) determines the absolute pasteboard size by multiplying the parent dimensions by the relative size specified in the pasteboard. If no pasteboard is specified, then a relative size of (1,1) is assumed. For example, if the specified size was (1000×2000) and the relative size (1.0,0.5), then the absolute size of the pasteboard will be (1000× 1000). The actual rendered object may not be this size depending on the FitMode and Angle attributes, as discussed above.

An SI object acts as a reference to a data file, or representation, that can be rendered into a raster image. The representation may be one of several types, such as, raster, text and/or vector graphics. Also, one object may reference several representations, each of which represents the same image but may differ in the storage format, size and/or resolution. When ReadObject( ) is invoked, it must determine which representation is the "best" representation to render by invoking the Finder( ) procedure. Finder( ) will locate all representations referenced by the object and will choose which representation is most appropriate for rendering.

Once a representation has been selected, it must be rendered into a raster image. Each supported data type must have a render procedure associated with it to convert the representation into a raster image. These render procedures must support the FitMode and Angle attributes. Preferably, the following data types are supported:

| Date Type | Renderer | Example |
| --- | --- | --- |
| raster | render_raster ( ) | TiFF, RES, PCX |
| simple text | render_text ( ) | one line of text, one font |
| simple graphics | render_graphics ( ) | CGM |
| pattern | render_pattern ( ) | constant color |
| IPD | render_ipd ( ) | |

The Render( ) procedure may incorporate the rotation angle directly into the object rendering, or it may apply a raster rotation operation to the rasterized object. For example, available text rendering programs have the ability to directly render text at a specified angle, resulting in better quality than a horizontal render followed by a raster rotation.

As previously discussed, the ControlPoint must be adjusted to keep the same relative position of the rendered object and the MergePoint depending on the Fit Mode, Justification, and Angle. It is the responsibility of ReadObject( ) to make this adjustment, and to insert the adjusted ControlPoint into the raster image header to make it available to any IPOs that may also adjust it (such as SpatialTransform).

AS. Finder

The ReadObject( ) procedure invokes the Finder( ) function to locate and return object data for rendering into an output raster image. The Finder( ) procedure performs six actions pursuant to the rendering of an SI: 1) locates all representations of the object; 2) identifies the type of each representation (TiFF, text, graphics); 3) determines attributes of each representation that are necessary for choosing the best representation; 4) applies a merit function to each available representation and selects the representation with the highest merit value; 5) returns a pointer to the representation data; and 6) returns the representation data type. The Finder( ) mechanism is necessarily dependent on the particular implementation. However, some statements as to functionality can be made.

In the current syntax of the Structured Image Definition Language (SIDL), an SI object can be described in one of three ways (the following source code is subject to copyright protection, as discussed above, and can be executed on the hardware system previously described):

```
(1) Object = {
        External = {
            System = "UNIX ®"
            Name = "bird.TiF";
```

-continued

```
    };
                };
(2) Object = {
        Internal = {
            Bytecount = 1024;
            Data = {
                ...
            };
        };
    };
(3) Object = {
        IPD = {
            AspectRatio = 1.5;
            DefaultWidth = 4 in;
            ...
        };
    };
```

An object defined as External is such that data referenced by the object is not stored within the current SID. Typically, the actual data is stored in a separate file. The System field is a description that the Finder( ) uses to understand how to locate the data. The Name entry is a set of key words that Finder( ) will use to actually locate the desired data. In the example above, Finder( ) is implemented to understand that a system entry of "UNIX@" indicates that the actual data will be found by searching an appropriate UNIX® file system path for a file with the name entry of "bird.TiF". If the System entry had been "SYBASE® ", then Finder( ) would treat the key words in the Name field as key words to search a SYBASE® database for the data.

An object defined as Internal contains the data stored directly within the SID. This is useful for storing small objects such as raster icons or simple text files directly within the SID, thus not requiring external storage.

IPD is an SI object data type that enables a structured image to be composed of other SI objects and IPOs. Based on the information stored within the SI object, Finder( ) must locate all available representations and determine the data type and any attributes required for choosing the "best" representation for rendering. The mechanisms/protocols used to implement these functions are not defined in SI, but it is understood that such mechanisms exist and are available for use herein.

Once all representations are determined, Finder( ) must choose the most appropriate representation to render into the output raster image. The mechanism is implemented by applying a merit function calculation to each representation. The exact merit function is implementation dependent and is not defined in the SI; however, it should be based on attributes of the representations, desired output image attributes, target output device (e.g., black and white printer, color display) and complexity of processing. Once a representation has been chosen, Finder( ) returns a pointer to the actual data and the data type to ReadObject( ) for processing to begin.

A6. Image Processing Definition (IPD)

Figure 10:
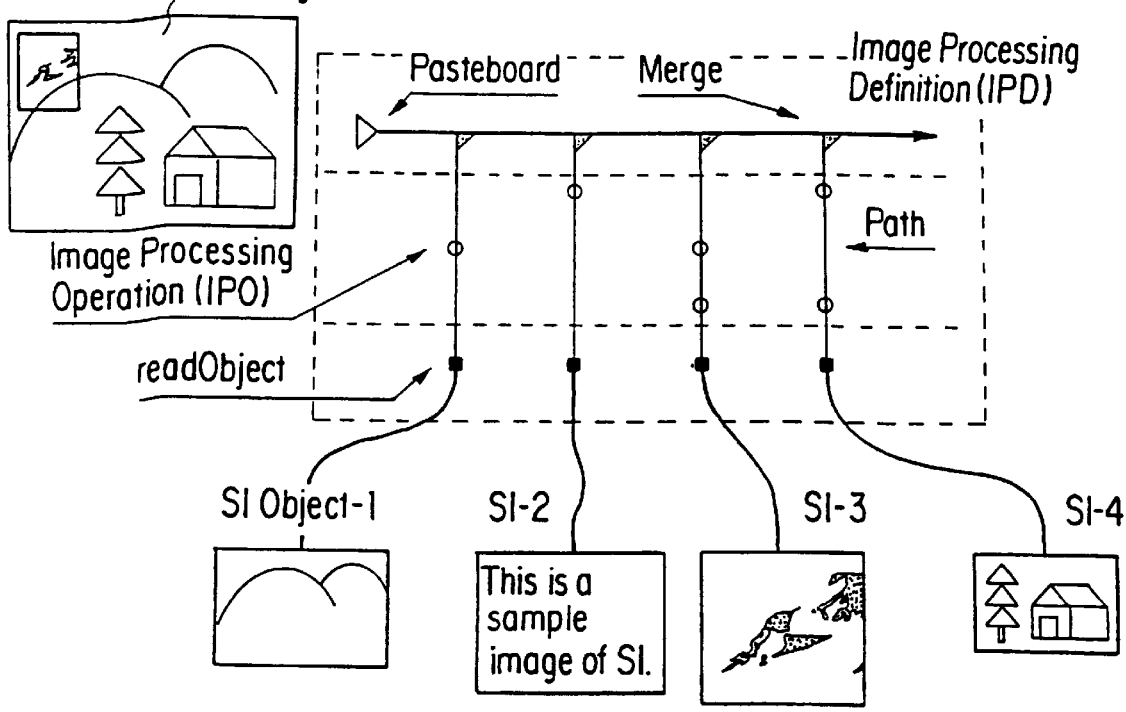
FIG. 10 is a graphic representation of an Image Processing Definition (IPD) as it relates to the output SI, which represents a structured description of references to component objects and Image Processing Operations (IPOs) applied to those component objects.

As discussed above, IPD is an SI object type that enables an SI to be composed of other SI objects and IPOs. IPD represents a structured description of references to component objects and IPOs applied to those component objects. FIG. 10 is a graphical representation of an IPD.

Figure 11:
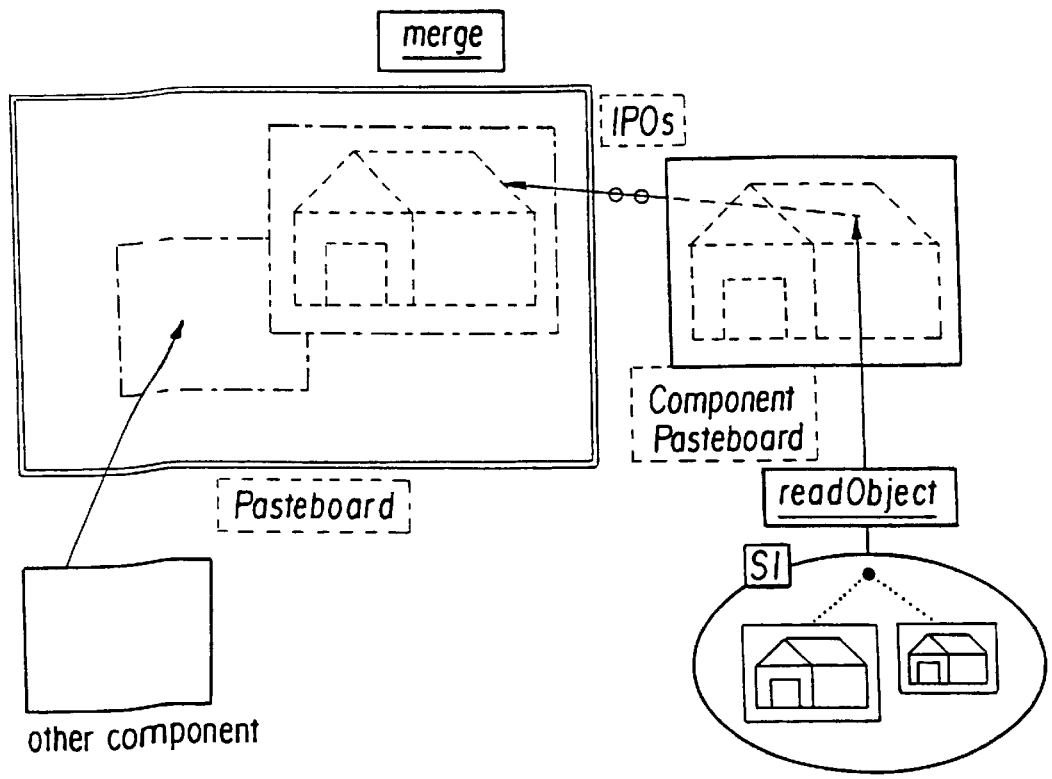
FIG. 11 depicts the flow of raster data during the rendering of an SI.

An IPD consists of references to the following descriptors: 1) default size; 2) ReadObject; 3) path; 4) IPO; 5) merge; 6) pasteboard; 7) initializer; and 8) component pasteboard. In FIG. 10, each vertical line, called a path, is a collection of IPOs. ReadObject represents a procedure that converts an SI object into a raster image suitable for processing by the IPO in the path. The rendered object flows through the path and is processed by each IPO sequentially. Each path has stored within it a pasteboard used by ReadObject to define a "frame" into which the SI object is rendered. This pasteboard is referred to as the component pasteboard. The horizontal line is the IPD object's pasteboard and represents a "blank" raster image onto which component pasteboards will be merged. The black triangles represent Merge operations where component pasteboards are combined onto the object's pasteboard. The merge order of component pasteboards is explicit, thus a sense of "top" and "bottom" images is supported. FIG. 11 depicts the flow of raster data during the rendering of an SI (i.e., the control flow from ReadObject to Merge).

Each IPD must include information which specifies a default size for the IPD. This information is used as a hint for the rendering programs as to the size the image was intended to be rendered to. In the current SIDL syntax, this information is preferably stored as an aspect ratio and a default width string. For instance,

```
IPD = {
    AspectRatio = 1.5;
    DefaultWidth = 4 in;
    ...
};
```

The AspectRatio field is defined by the ratio of height over width. The DefaultWidth field is a string defining a width and a unit. Possible units are: in, cm, mm, m, pt, and pix.

IPOs are device independent descriptions of image processing commands. Only one IPO is currently specified in SI: the SpatialTransform IPO, which will be discussed in greater detail in the examples that follow. It is understood, however, that additional IPOs will be implementation dependent. Among these, certain fundamental functions are considered essential and are preferred IPOs as follows:

| 1) Transformer: | spatially transforms the size or shape of an image (e.g., affine, warp); |
| 2) Formatter: | converts pixels from one format to another (e.g., convert, interleave, cspace); |
| 3) Filter: | applies various filtering operations (e.g., convolve, median, morphological); |
| 4) Colorizer: | adjusts color value of images (e.g., relative, absolute, contrast, white-point); |
| 5) Mask: | apply mask operations (e.g., add, extract, convert, apply); and |
| 6) Misc.: | apply other miscellaneous operations. |

An IPO can specify the selection region of its operation. A selection is a description of which pixels in an image are to be processed in a specific operation. For example, a selection may include bitmaps or mathematical descriptions of regions. Normally, selections are binary in nature, i.e., a pixel is either processed or not processed. However, a "gray" selection value will cause the output pixel value to be scaled between the original pixel value and the processed pixel value.

Figure 12:
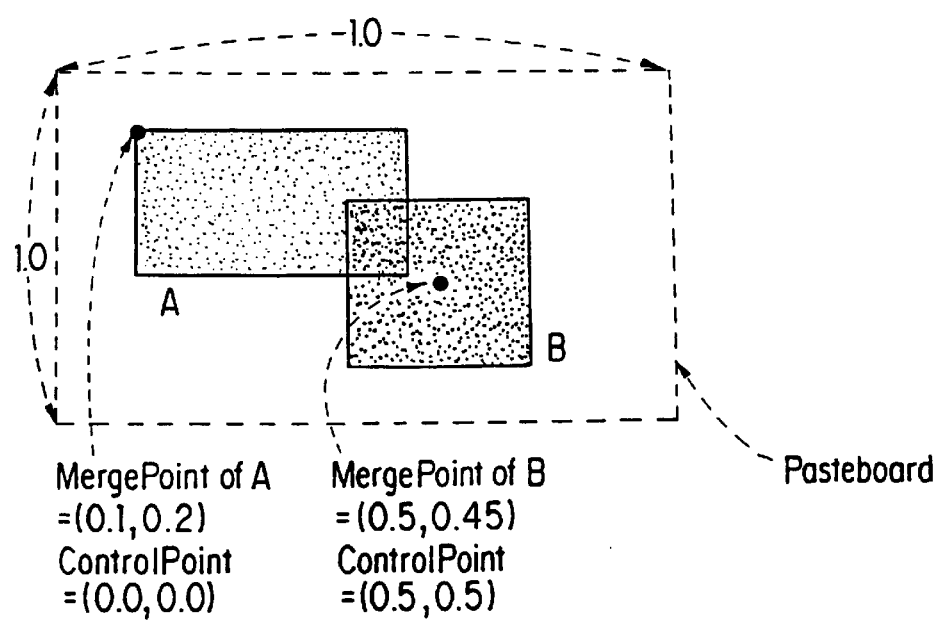
FIG. 12 is a graphic representation showing all child objects are merged into the parent pasteboard at the location specified by the MergePoint (relative to the object pasteboard) and the ControlPoint (relative to the child pasteboard)

As shown in FIG. 12, all child objects in an IPD are merged into the parent pasteboard at the location specified by the MergePoint (relative to the object pasteboard) and the ControlPoint (relative to the child pasteboard). Merge order is explicit in the IPD.

Figure 13:
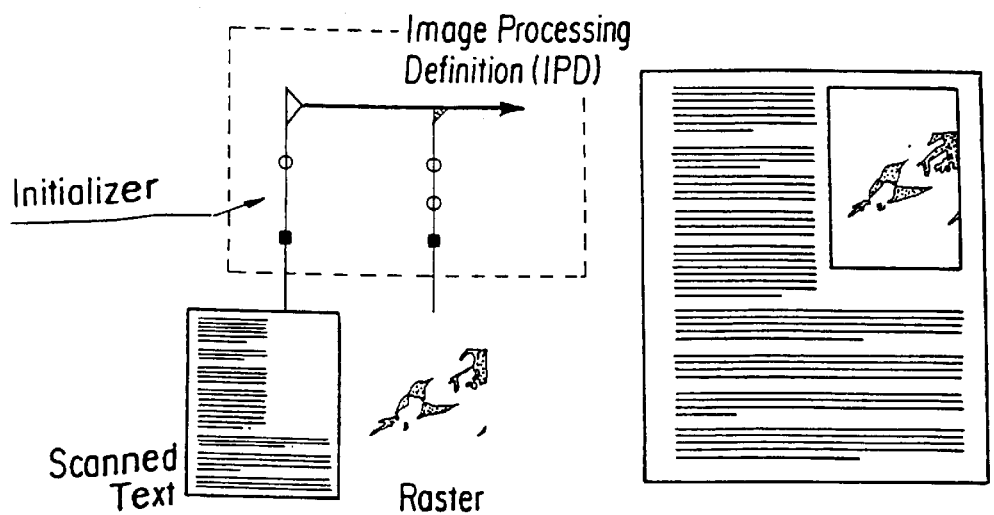
FIG. 13 is a graphic representation showing the pasteboard initializer function, in this case, initializing a pasteboard with a scanned text image.

Normally, the pasteboard of an IPD object represents a "blank" raster onto which component pasteboards are merged. It is possible to initialize a pasteboard with a color, pattern, or even a raster image using the Initializer (see FIG. 13). An Initializer is actually a Path that contains a ReadObject( ) and IPOs. The restriction is that the relative size be (1.0,1.0) and that no spatial transformation IPOs exist in the Path. The pasteboard will be the size of the rendered Initializer. Typically the Initializer is used to colorize the pasteboard or to initialize the pasteboard with a background raster image.

B. Unbound/Incomplete Structured Images

The invention further allows for structured images to be defined that have fields within the SID identified as undefined. Such fields are place holders for data that will be dynamically bound to the SI and are run-time (render time) specific. There are two classifications for undefined fields: 1) Unbound SI; and 2) Incomplete SI.

B1. Unbound Structured Image

In general, component objects of an SI are not contained within the SID itself but are referenced by the fields of SI objects (such as the System and Name fields of an External object). In the current SIDL syntax, these fields can be labeled as undefined. This allows for the dynamic binding of data to the structured image.

Consider, for example, an interactive editing session where a user is creating an SI for printing. The SI is to be used only once, then discarded. The user creates the SI using an interactive SI editor (again, this is merely an exemplary way of creating the SI and is not necessarily any more preferred than creation by template or automatic creation using appropriate scanning software). All components of the SI are known and defined. Once completed, the user prints the SI and the job is complete. The SID generated to describe this SI is known as fully bound, meaning that all components were defined prior to rendering. That is, fully bound means that all objects in the IPD point to defined entities prior to the rendering of the output SI raster.

In many applications, however, fully bound images are not adequate for the job. Consider, for example, an advertiser generating a brochure in which one component of the image is to vary with geographic sales location. All possible images of this component are stored in a database. The advertiser can define the System entry of an External object to identify the database System, e.g., SYBASE®, but the Name field will be marked as undefined. At run-time, the correct key word can be dynamically bound to the object for generation of each requested output image. Using this method, a single SI can be used to generate many different output images. Unbound images are valid Sls, but they require additional information at runtime to be rendered.

Figure 14:
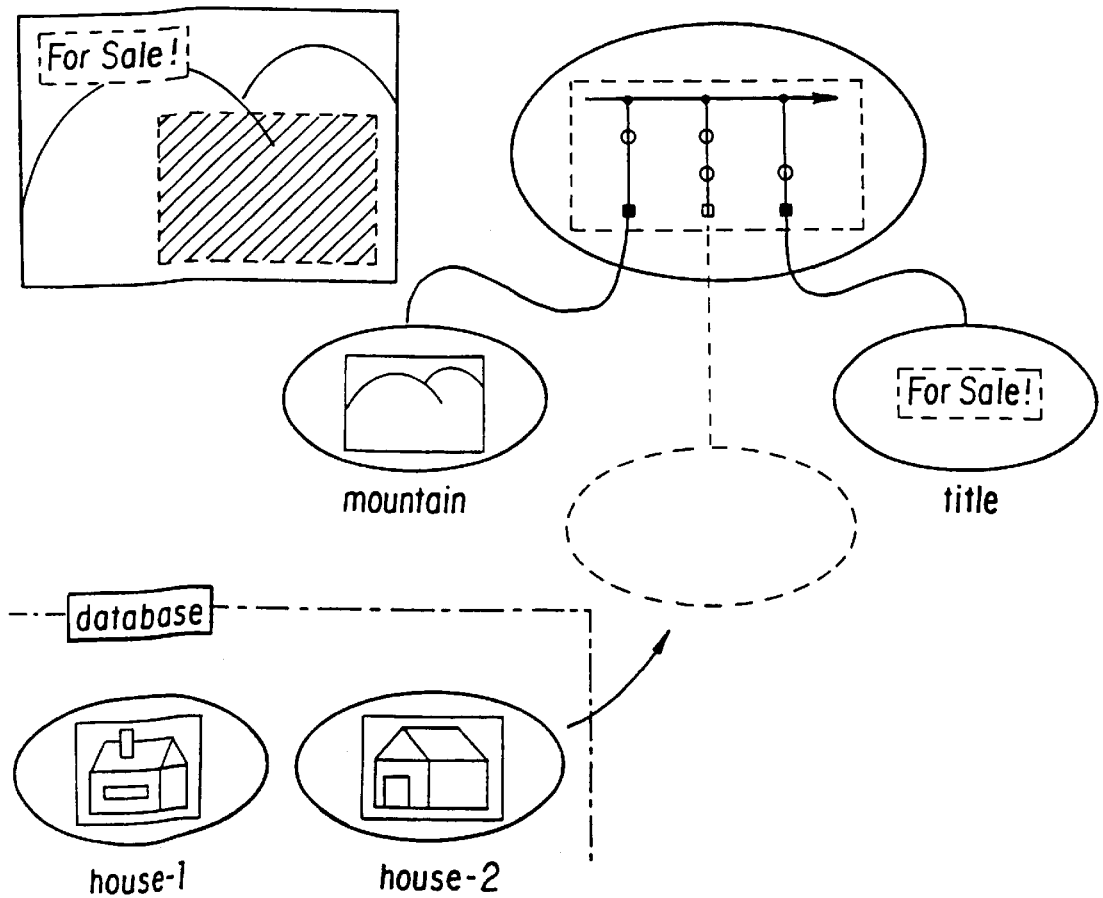
FIG. 14 is a graphic representation showing an Unbound SI (with respect to input objects) in accordance with the invention.

Notably, SI has no preference toward Bound or Unbound images, the choice is application dependent (see FIG. 14 for a representative user display using Unbound structured imaging).

B2. The Incomplete Structured Image

Figure 15:
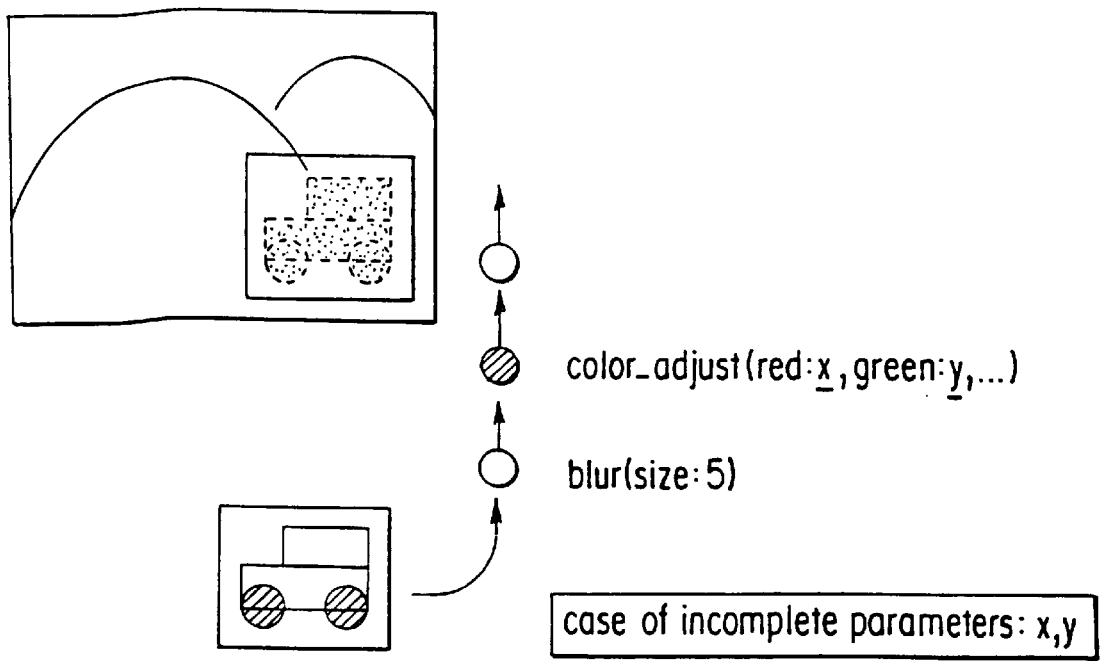
FIG. 15 is a graphic representation showing an Incomplete SI (with respect to image processing operations and/or attributes) in accordance with the invention.

Similar to the concept of Unbound images, the invention allows parameters of IPOs to be undefined. Also, an IPO itself may be undefined. For example, consider an advertiser creating a brochure containing automobile images in which the color of a car is to change between prints. The advertiser can have separate images of the car with all possible colors and use dynamic binding of the SID. The advertiser may also choose to use a single car image and pass the desired color as an argument to the render procedures to be dynamically bound to the IPO. Without the color value being provided at run-time, the rendering of the output raster could not be performed. This is known as an "incomplete" SI (see FIG. 15). An incomplete SI is one in which some part of the SID is not defined and must be bound at run-time. Incomplete SIs are valid SIs, but they cannot be rendered without additional information.

B3. Rendering Unbound/Incomplete Structured Images

There are two important considerations evident when rendering an unbound SI: 1) binding mechanism; and 2) rendering model.

The mechanism by which Unbound SIs are dynamically bound is implementation dependent. Four possible mechanisms are identified herein, however, others may be possible:
1) Require that SI always represents a "complete image"; if SI is unbound/incomplete, perform a prefiltering operation to modify SID.
2) Using current reference binding mechanism. The SID file can include undefined references and binding information as described in another file as "tag" definitions corresponding to undefined references in SIDL. Binding is realized, for example, by concatenating the SID file and the bind information to create a complete SID;
3) Specify the binding information as parameters to the SI renderer; or
4) Include a Dynamic Binding Method to the Finder( ) procedure that is invoked automatically to satisfy any unbound/incomplete field in the SID.

For purposes of the invention, all of the above described binding mechanisms are preferred, however, it is understood that the choice between the various mechanisms will be implementation dependent.

For certain applications, an SI may have fields that cannot be fully bound at render-time. For example, consider a document where each page is an SI containing six identical child objects that are to be bound at render-time, e.g., a real estate listing where each child object corresponds to a house for sale. Consider that the document is to display a total of nine houses. This would require two document pages, but only three of the child objects will be required on the second page. The SI renderer can operate in three models, although others may be possible: 1) fail with an unbound error; 2) ignore unbound objects, treat incomplete IPOs as non-operations; and 3) render only the pasteboard of unbound objects, treat incomplete IPOs as non-operations.

All three models are preferred for use with the invention, however, it is appreciated that the choice is application dependent.

C. Rendering

Although rendering is not specifically defined in the SIDL, a brief explanation is provided herein for clarity. In real rendering processes, some rendering methods can be selected according to conditions such as purpose, priority, resources and so on. Rendering is an implementation specific concern, however, it is understood that all implementations of SI rendering programs must produce equivalent output for a given SI and output device. It is not expected that results be exactly identical because slight differences in image processing programs will produce different results; however, the outputs must be reasonable. This statement is much like saying different C compilers do not have to generate identical machine code, but all compilers must generate working machine code.

Two approaches have been examined for rendering of SIs: 1) Object-oriented rendering; and 2) Processing-tree rendering.

C1. Object-Oriented Rendering

Figure 16:
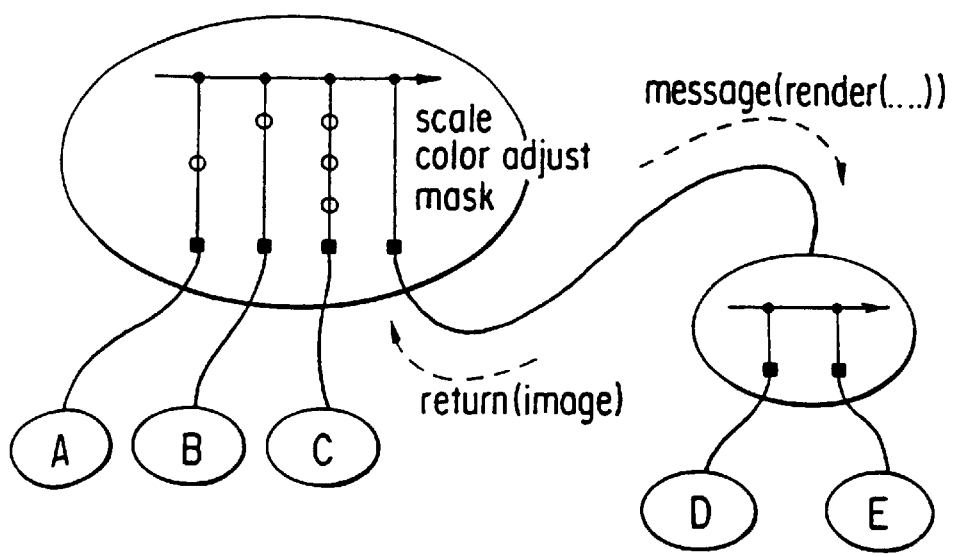
FIG. 16 is a graphic representation showing Object-oriented rendering in accordance with the invention.

Object-oriented rendering (see FIG. 16) is a method of top-down parsing of an object tree directly and rendering each object (SI) as you go. When an SI receives a message "render", it is rendered by given size and resolution attributes or dimension attributes. If other components are needed for construction of the SI, the object sends the "render" message to the component objects and gets the output images. Object-oriented rendering is direct execution of an object tree, which can best be thought of as "interpretation" of an object tree. Object-oriented rendering is especially suited for rendering in interactive editing situations.

C2. Processing-Tree Rendering

Figure 17:
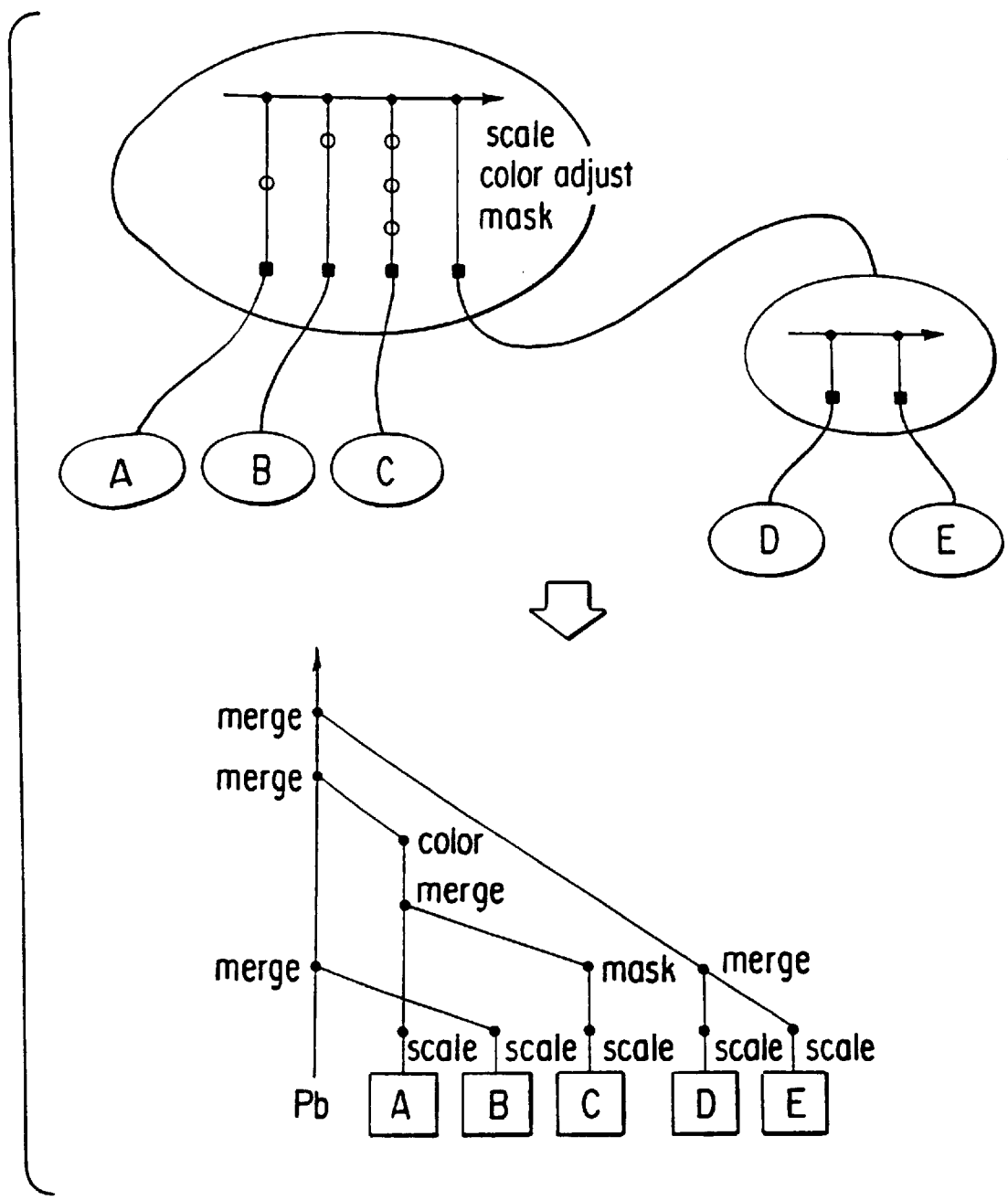
FIG. 17 is a graphic representation showing Processing-tree rendering in accordance with the invention.

A Processing-tree is a directed acyclic graph of image processing commands that is device dependent and resolution dependent (see FIG. 17). A Processing-tree is generating by expanding the SID associated with all nested SIs into a single SI, then applying device dependent information to convert all coordinates and dimensions into absolute, device dependent values. Data contents pointed to by representation entries are rendered into rasters. Since the Processing-tree is device dependent and resolution dependent, the IPOs can be optimized for processing speed by a variety of optimizing techniques that are understood by those skilled in the art. For example, the user may combine two scale and one rotate operation into one affine operation, thereby combining conforming cascaded operations into affine. In essence, why perform three separate operations when they may be combined into one to improve processing speed.

The output image is then rendered by a simple traversal of the resulting Processing-tree. This can be thought of as a "compilation" of an object tree. Processing-tree rendering is especially suited for rendering of very large output images that are typical in document printing. The image processing optimization can decrease the time required for rendering significantly.

D. Example of Structured Imaging

Figure 18:
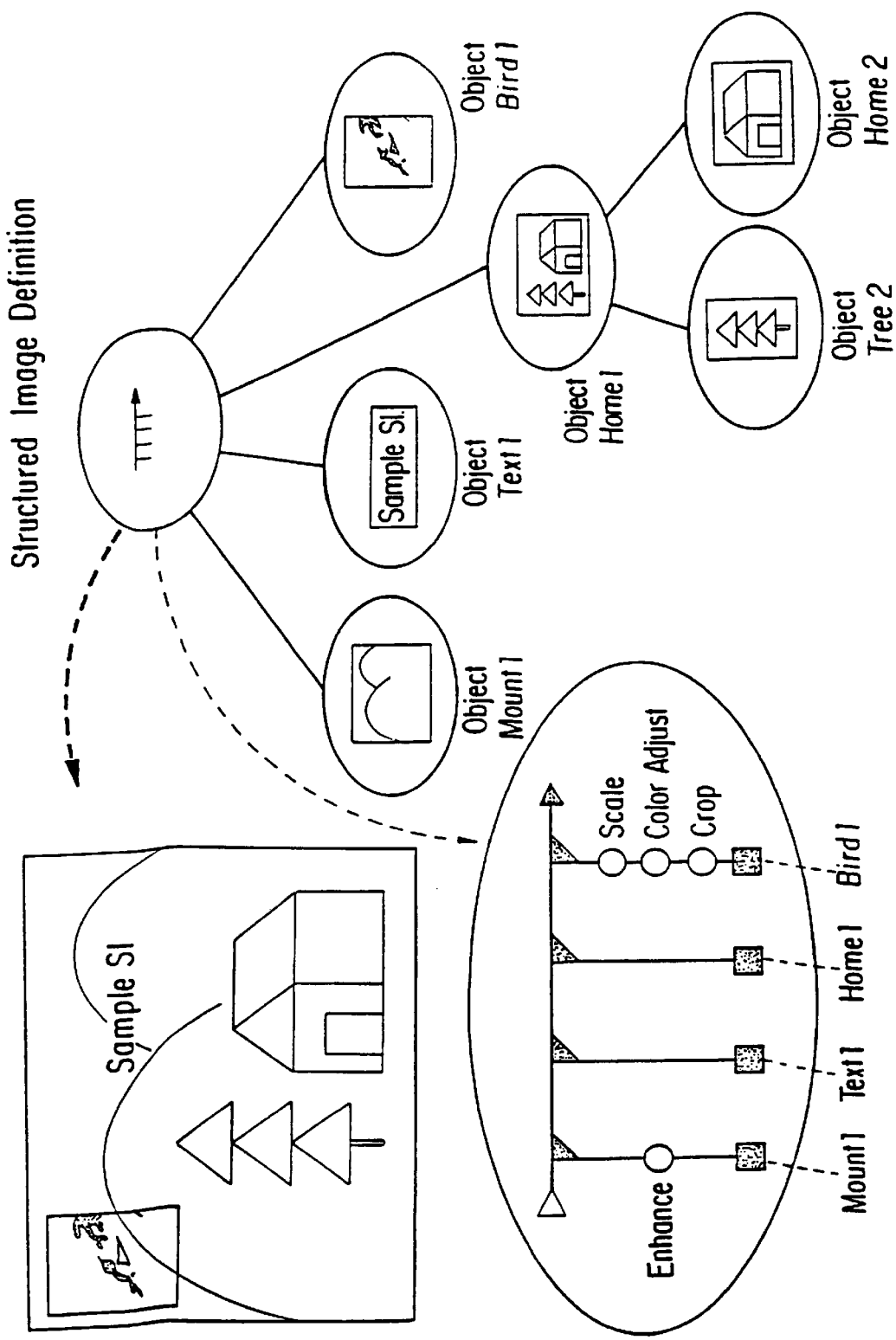
FIG. 18 provides a sample SI with associated SID file graphically displayed in accordance with the invention.

The SI shown in FIG. 18, is briefly described below. This descriptive example is written using the SIDL as described above.

The top level SI in this composite comprises four components:

1) mountain image—raster image object (Mount1);
2) "Sample . . . "—text object (Text1);
3) tree and house—IPD (Home1); and
4) bird image—bitmap raster object (Bird1).

The second level SI comprises two components:

1) tree graphics—graphics object (Tree2); and
2) house image—raster object (Home2).

The SID file associated with the top level SI is depicted in FIGS. 19a–c. SIs are described (again, the following source code is subject to copyright protection and can be executed on the hardware system previously described) as a set of "tags" in SIDL, which are specified by the name of tag type and tag body enclosed by "{" and "}". Tags may be named using the ":name" syntax. The tag name can be used as reference to other tags by prefixing "$". The Object tag is the top level tag of the SI. In this example, the Object tag represents an IPD object and its description is in the referenced tag "ipd1". The IPD tag "ipd1" defines the AspectRatio and DefaultWidth tags, the pasteboard attributes FitMode, Justification and Angle, and four Merge tags whose sequence specifies the merging order of "merge1" through "merge4". Each Merge tag specifies a merging point relative to the pasteboard with the MergePoint tag, and an image processing sequence with a Path tag. The Path tag denotes the child object with another Object tag, the relative size with a Size tag, the position of the ControlPoint (relative to the child) with the ControlPoint tag, and the image processing operations with a list of IPO tags. Notice that path1, path2 and path4 all refer to raster, text or graphic files. Path3 refers to another SID file that creates a raster image from combining a graphical tree with a raster image of a house.

D1. Multiple Representations (MR) File Format

Figure 20B:
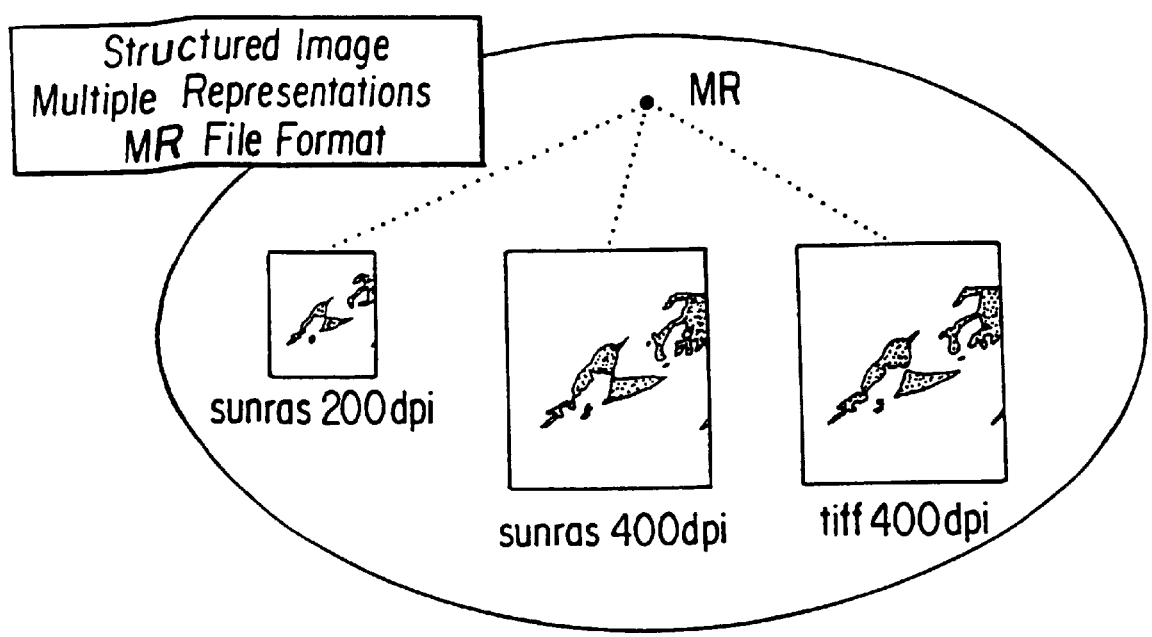

For some applications, explicit descriptions of available representations are preferred. For this reason, the MR file format is defined. This file format currently uses syntax similar to the SIDL. FIGS. 20a–b are examples of the MR file format. Each representation is listed with a Format field that identifies the file type, and a Data field to explicitly define the data. For filebased data such as a TiFF file, the Data field contains a UNIX® path to the file. For simple text, the Data field contains the text string. The MR format allows each representation to have explicitly defined a set of attributes that describe the data. For raster data, attributes may include dimension, photometry, or other attributes. For text objects, the attributes may include the font, style, etc. Use of the MR file format, however, is not preferred with this invention.

D2. SpatialTransform Image Processing Operation (IPO)

The only IPO specified within the SI format is the SpatialTransform IPO, which serves to perform linear spatial transformation on raster image contents. Examples include, rotation, scaling, and shearing. In general, the SpatialTransform IPO performs all affine transformations except translation (which is controlled through the MergePoint and the ControlPoint attributes).

The parameters of SpatialTransform are as follows:

| Parameter | Value |
| --- | --- |
| Scale | 1 value for XY-scale (preserve a.r.) or 2 values for arbitrary scale (interpolation is application dependent-note: probably should be an argument) |
| Rotate | Angle (in degrees) |
| Shear | Shear Angle (in degrees) |
| Mirror | "X" or "Y" |
| TransformPoints | 3 pairs of corner points |
| Affine | Affine coefficients |
| FixedPoint | (x,y) relative to child being transformed - default value is the ControlPoint location |

The FixedPoint parameter allows the application of spatial transformations around a point of reference. For example, specifying a FixedPoint allows the user to rotate the object around the FixedPoint instead of rotating around the center of the object. In general, any supported spatial transformation can be defined to operate around FixedPoint. Since the FixedPoint is a parameter to SpatialTransform and is not part of the pasteboard, the IPO adjusts the ControlPoint automatically to ensure that the child object is merged into the parent pasteboard at the correct position. An example of how the ControlPoint is adjusted is described below.

Figure 21:
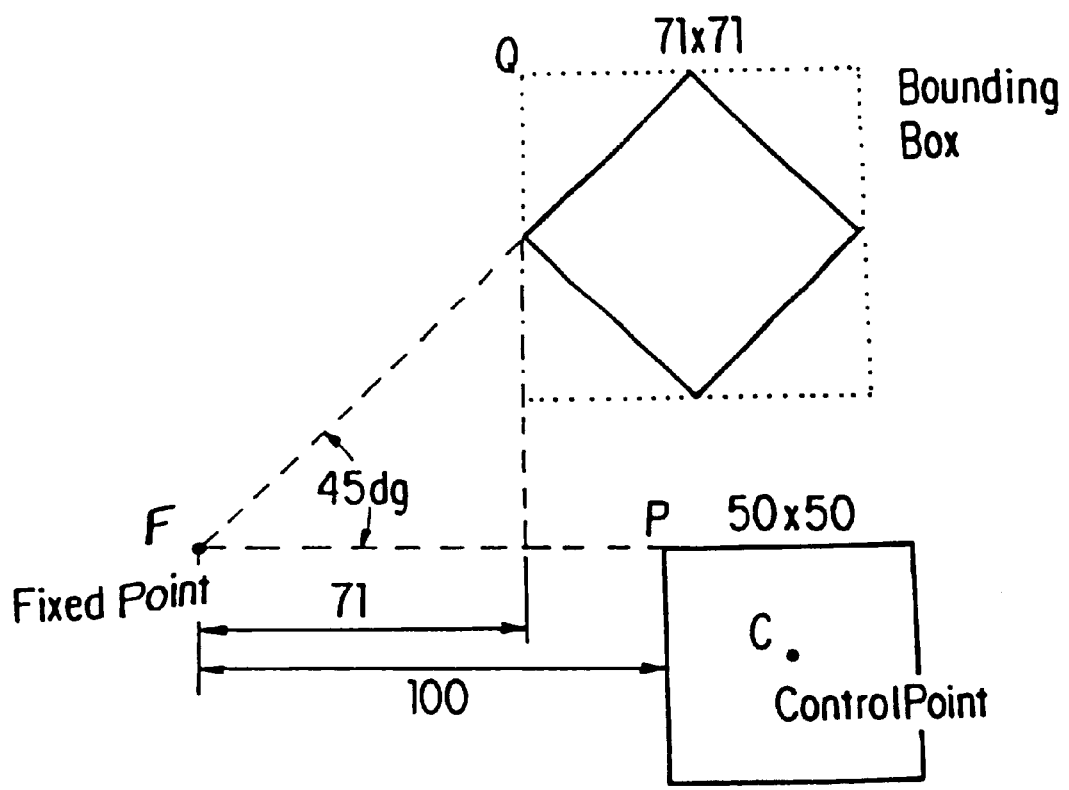
FIG. 21 graphically demonstrates the interaction between FixedPoint and ControlPoint in accordance with the invention.

For example (see FIGS. 21a–b), the object has a ControlPoint C of (0.5,0.5) and a fixed point of (2.0,0.0) relative to upper left corner P of the child. Suppose the rendering indicates the child is of size 50×50. The FixedPoint F is (−100,0) relative to the child. The ControlPoint is initially (25,25) relative to P, and (125,25) relative to the FixedPoint. Rotating the child 45° about the FixedPoint will generate a child with a new size of 71×71 (bounding box) with an origin at (71,107) relative to the FixedPoint. Recall that the original control point was (125,25) relative to the Fixed- Point. Therefore, the ControlPoint will be adjusted to be (125,25)–(71,31 107)=(54, 132) in pixel size, i.e., (0.76, 1.86) relative to the origin Q of the rotated child. Thus, the ControlPoint will be adjusted to ensure that rotation about a FixedPoint will result in the child being merged into the pasteboard at the proper position.

Alternatively, an interactive editor can handle center of rotation, etc., during creation of the SI and simply adjust the MergePoint properly when writing the SID. That is, the user can set the center of rotation, for example, at a desired location and the SID is no longer concerned with it.

E. A Second Example of Structured Image Generation

Importantly, SI is much more than a mere interactive editor. For instance, a high school yearbook printer has many individual pictures to prepare electronically for printing as a finished yearbook. In particular, photos must be scanned into the database, either individually (which is extremely time consuming) or technology exists where up to twelve photos may be scanned in at a time. Unfortunately, however, no matter how hard the user attempts to properly line up the individual pictures for scanning, there will always be slight deviations as a result of scanning. Usually each picture has a bar code or some other identifying feature to tie the picture to the name which will be printed under it.

Software exists that is capable of generating an SI automatically in the scanning situation described above. That is, an SI is created that identifies each individual child object (i.e., the individual pictures) and includes image processing operations to correct any misalignment, and properly configure each picture on the page with the appropriate text underneath (bar code reference). Such software is capable of scanning many objects at a time and each child object will be derotated/rotated for proper rendering at printing. Therefore, the yearbook printer can, at his option, pick only the child objects desired for placement on that particular page, line them up as desired, add appropriate text, and print. As discussed above, the child objects are referenced by bar code for call up.

Additionally, the yearbook printed may wish to create another SI by creating a template with "unbound" holes for the pictures and text as desired. The yearbook printer then binds the appropriate number of child objects to that template for printing. Importantly, however, the template can also have intelligent processing built in (i.e., background, etc.) that will automatically change color, cropping, special effects, and so forth.

F. Conclusion

The foregoing inventive concept allows for the representation of complex color raster images as a collection of objects in a hierarchial and device independent format. Objects contributing to the output raster may originate from text, graphics, other rasters, or other SIs, and maintain their heritage for selectibility and modification. An SI includes not only the source data, but also the image processing operations required for rendering them. SI technology supports reeditability, customization and enhancement, automatic image assembly, and high performance imaging (i.e., parallel, distributed, caching, etc). This provides a very powerful framework for describing images for later editing and reediting. SI, then, is a base technology capable of addressing the entire gamut of acquisition of objects, storage, edit/preparation and delivery/transmit to output rendering.

While the invention is described with reference to a preferred embodiment, this particular embodiment is intended to be illustrative, not limiting. Various modifications may be made without departing from the spirit and scope of the invention as defined in the amended claims.

What is claimed is:

1. An electronic image generator, comprising:
a constructing module capable of constructing and displaying a representation, said representation comprising data that can be rendered as a raster and a pasteboard having at least one image attribute, said pasteboard representing a frame onto which said data is rendered, wherein said constructing module is capable of forming and modifying said representation in accordance with the at least one image attribute of said pasteboard; and
a rendering module in communication with said constructing module, the rendering module capable of rendering the representation into a raster.

2. The electronic image generator of claim 1, wherein said rendering module and said constructing module are responsive to computer program instructions and operator inputted commands using at least one of a keyboard, a mouse, a touch-screen and an electronic pen.

3. The electronic image generator of claim 1, wherein said representation of an image further comprises at least one image processing operation.

4. The electronic image generator of claim 1, further comprising a printing module coupled to said rendering module and said constructing module, for printing said representation of an image.

5. The electronic image generator of claim 1, wherein said constructing module is capable of modifying said pasteboard, including said one image attribute, responsive to computer program instructions and operator inputted commands using at least one of a keyboard, a mouse, a touch-screen and an electronic pen.

6. The electronic image generator of claim 1, wherein said representation further comprises at least one individually manipulable component image comprising component image data that can be rendered as a raster, said component image further comprising a component image pasteboard having at least one image attribute, said component image pasteboard representing a frame onto which said component image data is rendered.

7. The electronic image generator of claim 1, wherein said constructing module is capable of simultaneously displaying a representation of the image and the at least one image attribute.

8. The electronic image generator of claim 1, wherein said constructing module and said rendering module are capable of constructing and rendering said representation to maintain an appearance of said representation independently of at least one of a resolution and a size of the displayed and printed image.

9. The electronic image generator of claim 1, further comprising a memory module, coupled to said rendering module and said constructing module, for storing said representation including said data that can be rendered as a raster.

10. The electronic image generator of claim 9, wherein said data are stored in said memory module in native format, said native format comprising at least one of a text file, a graphics file, a raster file, and an individually manipulable component image file.

11. The electronic image generator of claim 1, wherein said representation is capable of representing complex color and transparency values.

12. A process for electronically generating a representation of an image, comprising:
selecting data that can be rendered as a raster from a memory;

defining a pasteboard including at least one image attribute, said pasteboard representing a frame onto which said data is rendered;

constructing said representation of said image, comprising said data and said pasteboard, in accordance with the at least one image attribute of said pasteboard; and rendering said representation of said image capable of being displayed and printed.

13. The process of claim 12, further comprising at least one of displaying and printing said representation responsive to at least one of computer program instructions and operator inputted commands.

14. The process of claim 12, further comprising defining at least one image processing operation to be performed during said constructing step.

15. The process of claim 14, further comprising rendering and displaying on a display screen a graphical flow diagram including display icons representing the selected data, the pasteboard, the at least one image attribute, and the at least one image processing operation.

16. The process of claim 15, wherein the selecting, defining, constructing, rendering, and displaying are performed based upon computer program instructions and operator inputted commands input by manipulation of a cursor on said display screen using at least one of a keyboard, a mouse, a touch-screen, and an electronic pen.

17. The process of claim 15, further comprising displaying said representation of said image on said display screen simultaneously with said graphical flow diagram.

18. The process of claim 12, wherein said selected data comprises at least one individually manipulable component image comprising component image data that can be rendered as a raster and a component image pasteboard having at least one image attribute, said component image pasteboard representing a frame onto which said component image data is rendered.

19. The process of claim 18, further comprising:

defining at least one image processing operation to be performed during the constructing; and rendering and displaying on a display screen a graphical flow diagram including display icons representing the selected data, the at least one component image pasteboard attribute, the at least one image processing operation, the pasteboard, and the at least one image attribute.

20. An electronic image generator, comprising:

a constructing module capable of constructing and displaying a representation, said representation comprising at least one field of reference to data that can be rendered as a raster;

a rendering module in communication with said constructing module, the rendering module capable of rendering said representation, wherein the at least one field of reference is selected during the rendering of the representation; and a controlling module, responsive to at least one of computer program instructions and operating inputted commands, coupled to said rendering module, said controlling module being capable of recognizing said at least one field of reference during said rendering of said representation and being capable of providing said referenced data during the rendering of said representation.

21. The electronic image generator of claim 20, wherein said representation of an image further comprises a pasteboard having at least one image attribute, said pasteboard representing a frame onto which said data is rendered.

22. A process for electronically generating a representation of an image, comprising:

selecting data which can be rendered as a raster from a memory;

identifying, by means of an identifier, at least one image processing operation which is to be defined during the rendering of said representation;

constructing said representation of said image, comprising said data and said at least one identifier of an image processing operation;

rendering said representation of said image capable of being displayed and printed;

recognizing said at least one identifier of an image processing operation;

pausing the rendering of said image capable of being displayed and printed;

defining the identified image processing operation using at least one of computer program instructions and operator inputted commands; and completing the rendering of said image capable of being displayed and printed.

23. The process of claim 22, further comprising defining a pasteboard including at least one image attribute, said pasteboard representing a frame onto which said data is rendered, wherein said pasteboard is to be used during said constructing and said generating steps.

24. The process of claim 22, further comprising identifying a parameter of said image processing operation, said parameter being a subset of said identifier.

\* \* \* \* \*